(12) United States Patent
Vannarath et al.

(10) Patent No.: US 11,824,777 B1
(45) Date of Patent: Nov. 21, 2023

(54) SYSTEM AND METHOD FOR AUTOMATIC APPLIANCE CONFIGURATION AND OPERABILITY

(71) Applicant: AVIATRIX SYSTEMS, INC., Santa Clara, CA (US)

(72) Inventors: Praveen Vannarath, Sunnyvale, CA (US); Wing-kuen Chung, Los Altos Hills, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 16 days.

(21) Appl. No.: 17/332,990

(22) Filed: May 27, 2021

(51) Int. Cl.
| | |
|---|---|
| H04L 29/06 | (2006.01) |
| H04L 29/12 | (2006.01) |
| H04L 45/74 | (2022.01) |
| H04L 69/00 | (2022.01) |
| H04L 12/46 | (2006.01) |
| H04L 9/40 | (2022.01) |
| H04L 67/025 | (2022.01) |
| H04L 67/141 | (2022.01) |
| H04L 67/10 | (2022.01) |

(52) U.S. Cl.
CPC .......... *H04L 45/74* (2013.01); *H04L 12/4633* (2013.01); *H04L 63/20* (2013.01); *H04L 67/025* (2013.01); *H04L 67/10* (2013.01); *H04L 67/141* (2013.01); *H04L 69/02* (2013.01)

(58) Field of Classification Search
CPC ..... H04L 45/74; H04L 12/4633; H04L 63/20; H04L 67/025
USPC ...................................................... 370/392
See application file for complete search history.

(56) References Cited

U.S. PATENT DOCUMENTS

| | | | | |
|---|---|---|---|---|
| 10,742,476 | B2* | 8/2020 | Xu ........................ | H04W 88/16 |
| 2005/0267982 | A1* | 12/2005 | Nakatani ............. | H04L 67/1097 |
| | | | | 709/233 |
| 2007/0297445 | A1* | 12/2007 | Lu ....................... | H04L 65/1104 |
| | | | | 370/466 |
| 2015/0215202 | A1* | 7/2015 | Sauer ...................... | H04L 45/38 |
| | | | | 370/254 |

(Continued)

OTHER PUBLICATIONS

Martin Sauter, "SSH Tunnels, TCP Port 443 and Socat", Apr. 2021, Wirelessmoves, https://blog.wirelessmoves.com/2021/04/ssh-tunnels-tcp-port-443-and-socat.html (Year: 2021).*

(Continued)

*Primary Examiner* — Ruolei Zong
(74) *Attorney, Agent, or Firm* — Winstead PC (57) ABSTRACT

In one embodiment, a cloud connection appliance features a processor and a non-transitory storage medium. The non-transitory storage medium comprises management control logic, that when executed by the processor, controls registration with a controller adapted to control data traffic between gateway instance and to establish a communication path including a reverse tunnel with the controller. The controller and cloud connection appliance operate in a client-server relationship with the cloud connection appliance operates as a client when establishing the communication path and operates as a server when receiving control information through the reverse tunnel. The reverse tunnel enables the cloud connection appliance to directly receive the control information from the controller despite the cloud connection application lacking a publicly routable Internet Protocol (IP) address.

18 Claims, 4 Drawing Sheets

(56) References Cited

U.S. PATENT DOCUMENTS

| | | | | |
|---|---|---|---|---|
| 2016/0197933 | A1* | 7/2016 | Lapidous | H04L 63/0272 726/26 |
| 2020/0244749 | A1* | 7/2020 | Balthaser | G06F 9/45558 |
| 2021/0303366 | A1* | 9/2021 | Anderson | H04L 12/66 |
| 2021/0409403 | A1* | 12/2021 | Lewin | H04L 63/0807 |

OTHER PUBLICATIONS

Unknown, "TCP UDP Port Nos. and Well known ports, Multiplexing and Demultiplexing", Feb. 2021, omnisecu.com, https://web.archive.org/web/20210226102639/https://www.omnisecu.com/tcpip/tcp-port-Numbers.php (Year: 2021).*

Alexandru Andrei, "How to Use Reverse SSH Tunnel to Allow External Connections to Your PC", Feb. 2019, maketecheasier.com, https://www.maketecheasier.com/reverse-ssh-tunnel-allow-external-connections/ (Year: 2019).*

Himanshu Arora, "How to Setup Reverse SSH Tunnel on Linux", Nov. 2013, thegeekstuff.com, https://www.thegeekstuff.com/2013/11/reverse-ssh-tunnel/ (Year: 2016).*

Unknown, "How To Set Up SSH Tunneling on a VPS", Sep. 2013, digitalocean.com, https://www.digitalocean.com/community/tutorials/how-to-set-up-ssh-tunneling-on-a-vps (Year: 2013).*

Alexandru Andrei, "How to Use Reverse SSH Tunnel to Allow External Connections to Your PC", 2019, maketecheasier.com, https://web.archive.org/web/20190801100036/https://www.maketecheasier.com/reverse-ssh-tunnel-allow-external-connections/ (Year: 2019).*

Simon Batt, "What Is 127.0 0.1, Localhost, or a Loopback Address", 2020, makeuseof.com, https://web.archive.org/web/20200810042726/https://www.makeuseof.com/tag/what-is-127-0-0-1-localhost-loopback-address/ (Year: 2020).*

* cited by examiner

SYSTEM AND METHOD FOR AUTOMATIC APPLIANCE CONFIGURATION AND OPERABILITY

FIELD

Embodiments of the disclosure relate to the field of networking. More specifically, one embodiment of the disclosure relates to a cloud platform architecture configured to automate and manage the provisioning, configuring and continued operability of an appliance deployed within a datacenter via a cloud-based controller.

GENERAL BACKGROUND

Over the past few years, cloud computing has provided an Infrastructure as a Service (IaaS), where resources are provided as part of a public cloud network and made accessible as a service to organizations as well as the persons associated with these organizations such as network administrators, employees, contractors, or the like (hereinafter, "users"). One of these services allows users to run software components (e.g., software instances such as virtual clients and/or virtual servers) within the public cloud network. Hence, the migration of software functionality into the public cloud network has led to greater usage of virtual private cloud networks.

A virtual private cloud network is a collection of software components operating as an on-demand, configurable pool of resources, including resources allocated from the public cloud network for providing a certain level of isolation between different users. The isolation between different users of the same public cloud network may be achieved through access controls and allocation of the virtual (software) components on a per user basis. For example, Amazon® Web Services (AWS®) provides for the purchase of Amazon® Elastic Compute Cloud (EC2) services, which provide dedicated data processing capabilities for the purchasing user.

Currently, one type of hardware appliance, commonly referred to as Aviatrix® CloudN™ appliance or "CloudN", may be deployed within a datacenter in order to boost throughput (i.e., data transmission rates) between instances operating within a virtual private cloud network and resources operating within the datacenter. In particular, CloudN is responsible for building an encrypted communication path extending from the datacenter to a particular type (or types) of virtual private cloud network(s) in order to provide significantly more throughput from/to the datacenter (e.g., performance gains of at least 200% up to 2500%). However, given that CloudN resides behind an edge server that handles the routing of egress/ingress communications from/to the datacenter, CloudN is not assigned a public Internet Protocol (IP) address. As a result, CloudN has been manually provisioned and configured by administrators of the datacenter, unlike the virtual gateways implemented as part of one or more virtual private cloud networks that are directly accessible by a controller using a public IP address assigned to that virtual gateway.

This manual configuration is problematic because human administrators provisioning and configuring the CloudN are more prone to error than an automated configuration scheme. Also, the manual configuration hampers scalability of the cloud platform.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of a system and method for automating an appliance deployed within a datacenter, namely an on-premises network or a co-location facility. Herein, the appliance may be a physical (hardware) appliance that is deployed within the datacenter and responsible for establishing a secure interconnect to a public cloud, and in particular, transit gateways within a virtual public cloud network implemented as part of the public cloud. The appliance operates as high-speed data transmission and encryption logic that provides up to 25 gigabits per second (Gbps) encryption performance over an interconnect such as Amazon Web Services (AWS) Direct Connect, Microsoft® Azure® Express Route or any IP-based network. As an alternative embodiment, the appliance may be implemented as a virtual appliance, with generally the same functionality as the physical appliance. Herein, this appliance is referred to as a "cloud connection appliance."

For this embodiment of the invention, the cloud connection appliance is communicatively coupled to (i) a cloud-based controller via a first (management) interconnect and (ii) at least one gateway within a virtual private (transit) cloud network, which provides users of an on-premises network with access to cloud resources over a second (data) interconnect. In particular, via the first interconnect, the controller is now able to provision, configure and conduct diagnostics of the operability of the cloud connection appliance. Using the second interconnect, the cloud connection appliance is able to establish a direct, high-speed (25 Gbps) secure connection from the datacenter to the virtual private cloud network. This high-speed secure connection enables on-premises resources (e.g. servers, computers or other network devices) to access and utilize resources residing in the cloud platform with minimal latency as well as to provide a higher speed connection for the migration of content from the datacenter to cloud storage within one or more virtual private cloud networks being part of the cloud platform.

Although conventional cloud platform architectures rely on independent actions by network administrators to provision, configure and management the cloud connection appliance within the datacenter (e.g., using a graphic user interface "GUI" associated with datacenter management), the cloud platform described below establishes a reverse tunnel as part of the management interconnect, namely a communication path established in accordance with a secure network protocol (e.g., Secure Shell "SSH" protocol) between the cloud connection appliance and the controller. The reverse tunnel allows for transmissions from the controller to the cloud connection appliance based on reserved communication ports, where data accessible to a reserved communication port at the cloud-based controller is accessible by the cloud connection appliance. The reverse tunnel allows the cloud-based controller to directly manage operability of the cloud connection appliance. For example, the controller is now able to directly send control information to the cloud connection appliance even though the cloud connection appliance lacks an assigned public Internet Protocol (IP) address because it resides behind an edge router for the datacenter.

Direct controller connectivity established through the reverse tunnel provides a number of advantages. For instance, it extends management of the cloud resources (e.g., gateways of the virtual private cloud networks) to include the cloud connection appliance (e.g., appliance communicatively coupling the datacenter to the cloud platform such as the CloudN appliance provided by Aviatrix System, Inc. of Santa Clara, Calif.) or multiple cloud connection appliances when deployed in redundancy. This eliminates the need to independently manage the cloud connection appliance. Now, the controller is able to perform diagnostics, upload a tracelog, and upgrade operability of the managed cloud connection appliance in a similar manner as the gateways within the virtual private cloud networks. Also, this direct controller connectivity allows for load balancing of data traffic from multiple transit gateways and supports scalability to achieve higher encrypted throughput through the high-speed connection between a transit private cloud network and the cloud connection appliance (e.g., CloudN appliance) deployed within the datacenter.

It is contemplated that each cloud connection appliance deployed as part of a datacenter may be configured to establishment communications with a single cloud platform or multiple cloud platforms that may be associated with different types of public cloud networks (e.g., AWS, Azure, etc.). Hence, the cloud connection appliance may be communicatively coupled to one or more transit gateways in different public cloud networks.

I. Terminology

In the following description, certain terminology is used to describe features of the invention. In certain situations, the terms "appliance," "logic" and "device" are representative of hardware, software or a combination thereof, which is configured to perform one or more functions. As hardware, the appliance (or logic or device) may include circuitry having data processing or storage functionality. Examples of such circuitry may include, but are not limited or restricted to a processor (e.g., a microprocessor, one or more processor cores, a programmable gate array, a microcontroller, an application specific integrated circuit, or other data processing component), wireless receiver, transmitter and/or transceiver circuitry, semiconductor memory, or combinatorial logic.

Alternatively, or in combination with the hardware circuitry described above, the appliance (or logic or device) may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

The term "computerized" generally represents that any corresponding operations are conducted by hardware in combination with software.

The term "gateway" may be construed as virtual or physical logic. For instance, as an illustrative example, each gateway may correspond to virtual logic in the form of a software component that perform routing of data. Although having similar architectures, the gateways may be identified differently based on their location/operability within the cloud platform. For example, a "spoke" gateway is a gateway configured to interact with stored cloud resources (e.g., software instances, etc.) while a "transit" gateway is configured to further assist in the propagation of data traffic (e.g., one or more messages) directed to a spoke gateway within a spoke VPC or directed to a computing device within the on-premises network.

As an illustrative example, each of the gateways operates, at least in part, as a routing component for virtual private cloud networks. Each gateway is assigned a Private IP address within an IP address range associated with a virtual private cloud network including the gateway. As described below, the gateways may enable the routing of data traffic from/to computing devices within the datacenter and instances within these virtual private cloud networks. Alternatively, in some embodiments, the gateway may correspond to physical logic, such as an electronic device that is communicatively coupled to the network and assigned the hardware (MAC) address and IP address.

The term "message" generally refers to information in a prescribed format and transmitted in accordance with a suitable delivery protocol. Hence, each message may be in the form of one or more packets, frames, a portion of the data traffic, or any other series of bits having the prescribed format.

The term "interconnect" may be construed as a physical or logical communication path between two or more electronic devices. For instance, as a physical communication path, wired and/or wireless interconnects may be provided in the form of electrical wiring, optical fiber, cable, bus trace, or a wireless channel using infrared, radio frequency (RF), may be used. As a logical communication path, the interconnect may constitute an interface such as an Application Programming Interface (API).

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Figure 1:
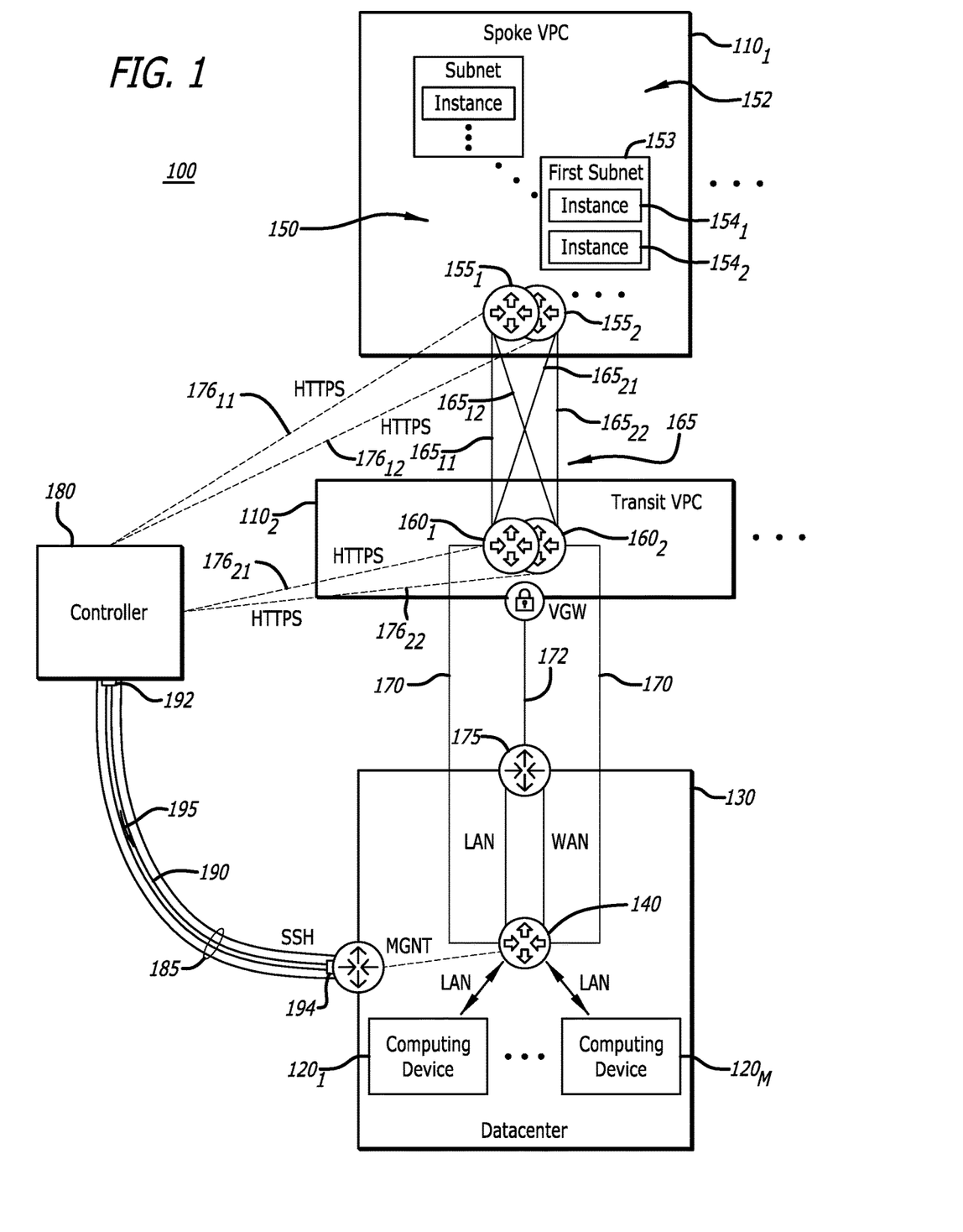
FIG. 1 is an exemplary embodiment of a cloud architecture featuring multiple virtual private cloud networks in communications with a datacenter including a cloud connection appliance that supports increased data transmission rates and is controlled by a controller through a reverse tunneling scheme.

Referring to FIG. 1, an exemplary embodiment of a cloud platform 100 featuring multiple virtual private cloud networks $110_1$-$110_N$ (N≥1) communicatively coupled to one or more computing devices $120_1$-$120_M$ (M≥1) within a datacenter 130. Herein, the datacenter 130 may operate as an on-premises network, featuring a cloud connection appliance 140 and the one or more computing devices $120_1$-$120_M$ in communications with the cloud connection appliance 140.

According to one embodiment of the disclosure, each of the virtual private cloud networks $110_1$-$110_N$ may correspond to a virtual private cloud network implemented as part of Amazon® Web Services (AWS) public cloud network. Additionally, or in the alternative, one of more of the virtual private cloud networks $110_1$-$110_N$ may be implemented as part of Google® Cloud and/or as part of Microsoft® Azure® public cloud network. Stated differently, the cloud platform 100 may be implemented as a single cloud network (e.g., AWS™, Google® Cloud, Azure®, etc.) or as a multi-cloud network with one or more of the virtual private cloud networks $110_1$-$110_N$ residing in different cloud networks (e.g., AWS™ and Azure®). Herein, for clarity, each of the virtual private cloud networks $110_1$-$110_N$ is referenced as a "VPC," independent of the type of cloud network.

Each of the VPCs $110_1$-$110_N$ includes one or more gateways, which are similar in architecture, but some of these VPCs may be identified differently based on their location/operability within the cloud platform 100. For instance, a first VPC $110_1$, referred to as a "spoke VPC," is configured to maintain cloud resources 150 accessible by a set of (e.g., two or more) spoke gateways $155_1$-$155_R$ (R≥1) deployed therein while a second VPC $110_2$, referred to as a "transit VPC," is configured to further assist in the propagation of data traffic (e.g., one or more messages) directed to one of the spoke gateways $155_1$ . . . , or $155_R$ or directed to one of the computing devices $120_1$-$120_M$ within the datacenter 130.

More specifically, as generally shown in FIG. 1, the spoke VPC $110_1$ features one or more instance subnetworks 152 (hereinafter, "subnets"), where each subnet 152 may include different cloud instances. As an illustrative example, as shown, a first subnet 153 may include a first instance $154_1$ directed to data processing functionality and/or a second instance $154_2$ directed to data storage functionality. Each of the subnets 152 is configured to exchange data traffic with a selected gateway of the set of gateways $155_1$-$155_R$ maintained in the spoke VPC $110_1$. Herein, these gateways $155_1$-$155_R$ are illustrated as "spoke gateways" $155_1$-$155_2$.

Each of the spoke gateways $155_1$-$155_2$ is communicatively coupled (i.e., direct or indirect connection) to a set of gateways $160_1$-$160_S$ (S≥2) within the transit VPC $110_2$ (illustrated as "transit gateways" $160_1$-$160_2$). These transit gateways $160_1$-$160_2$, potentially along with other transit gateways from different transit VPCs (not shown) form multiple egress/ingress data paths between the spoke VPC $110_1$ and the datacenter 130 based on active cryptographically secure tunnels 165 as described in pending U.S. patent application Ser. No. 17/186,911 filed Feb. 26, 2021, the entire contents of which are incorporated by reference herein.

Referring still to FIG. 1, the cloud connection appliance 140 is configured to establish a direct, high-speed connection 170 using AWS™ Direct Connect or Microsoft® Azure® Express Route to one or more transit gateways that may reside within the same or different public cloud networks. In particular, although not shown, the cloud connection appliance 140 may establish multiple high-speed connections with different transit gateways located on different public cloud networks. This provides each of the computing devices $120_1$-$120_M$ with high-speed connectivity to cloud resources on different public cloud networks in a concurrent manner (i.e. operating at least partially in time).

As shown, for this embodiment of the disclosure, the connection 170 overlays a network wide area network (WAN) connection 172 extending from an edge router 175 of the datacenter 130 to the transit gateways $160_1$-$160_2$ of the transit VPC $110_2$. The cloud connection appliance 140 is configured to provide each of the computing devices $120_1$-$120_M$, via local area network (LAN) and WAN connectivity, with an encryption transmission rate substantially greater than 2 Gbps, such as up to 25 Gbps. As a result, the computing devices $120_1$-$120_M$ are provided with low latency access to the cloud resources 150 in any of the spoke VPCs (e.g., spoke VPC $110_1$) along with enhanced transmission rates for easier migration of content from the datacenter 130 to be part of the cloud resources 150.

According to one embodiment of the disclosure, the cloud platform 100 includes peer-to-peer communication links $165_{1S}$-$165_{RS}$ established between the spoke gateways $155_1$-$155_R$ and the transit gateways $160_1$-$160_S$. As shown, these peer-to-peer communication links $165_{11}$-$165_{22}$ operate as cryptographically secure tunnels 165, such as tunnels operating in accordance with a secure network protocol. One example of a secure network protocol may include, but is not limited or restricted to Internet Protocol Security (IPSec). Hence, these cryptographically secure tunnels $165_{11}$-$165_{22}$ may be referred to as "IPSec tunnels."

The cloud platform 100 further includes a controller 180, which is configured to manage the routing of messages over the communication links $176_{1S}$-$176_{RS}$ with gateway routing tables (not shown) deployed within each of the gateways $155_1$-$155_R$ and $160_1$-$160_S$ as well as the cloud connection appliance 140 via management interconnect 185. The controller 180 may be deployed as virtual logic in the form of a software component (instance) that provides programmatic control over native constructs of one or more public cloud networks, and thus, is configured to monitor for gateway state changes. The controller 180 is executed by a cloud-based compute services (e.g., Elastic Compute Cloud EC2, etc.) that are based on physical processor(s) and memory associated with the public cloud infrastructure.

Operating in concert with the cloud connection appliance 140 within the datacenter 130, the cloud-based controller 180 establishes the management interconnect 185, which constitutes a secure communication path operating in accordance with a secure network protocol (e.g., Secure Shell "SSH" protocol) and utilizing a specific Transmission Control Protocol (TCP) port (e.g., TCP port 443). Within this secure communication path 185 (e.g., SSH communication path), the controller 180 and cloud connection appliance 140 may further establish a reverse tunnel 190 to allow the controller 180 to directly communicate and manage operability of the cloud connection appliance 140.

For example, in lieu of TCP port 22, the TCP port 443 supports the SSH communication path 185 between the controller 180 and the cloud connection appliance 140. Also, additional network ports 192 and 194 are reserved as ingress and egress points for the reverse tunnel 190 being a specific communication path encapsulated within the SSH communication path 185. Hence, placement of control information 195 on network port 192 may appear to be directed locally, but in fact, the control information 195 is routed for receipt by the cloud connection appliance 140 over the prescribed network port 194 of the reverse tunnel 190. The reverse tunnel 190 enables the controller 180 to directly send the control information 195 to the cloud connection appliance 140 even though the cloud connection appliance 140 lacks an assigned public Internet Protocol (IP) address because it resides behind the edge router 175 of the datacenter 130.

Based on the establishment of the reverse tunnel 190 encapsulated within the SSH communication path 185, the controller 180 extends its management of the cloud resources (e.g., gateways of the virtual private cloud networks) to include the cloud connection appliance 140, which operates as the high-speed encryption/decryption mechanism for messages exchanged between the cloud platform 100 and the datacenter 130. This allows the controller 180 to provision or configure the cloud connection appliance 140 as well as conduct diagnostics of certain functionalities supported by the cloud connection appliance 140. This further allows for greater cloud platform scalability given that independent management of the cloud connection appliance 140 is unnecessary.

Figure 2:
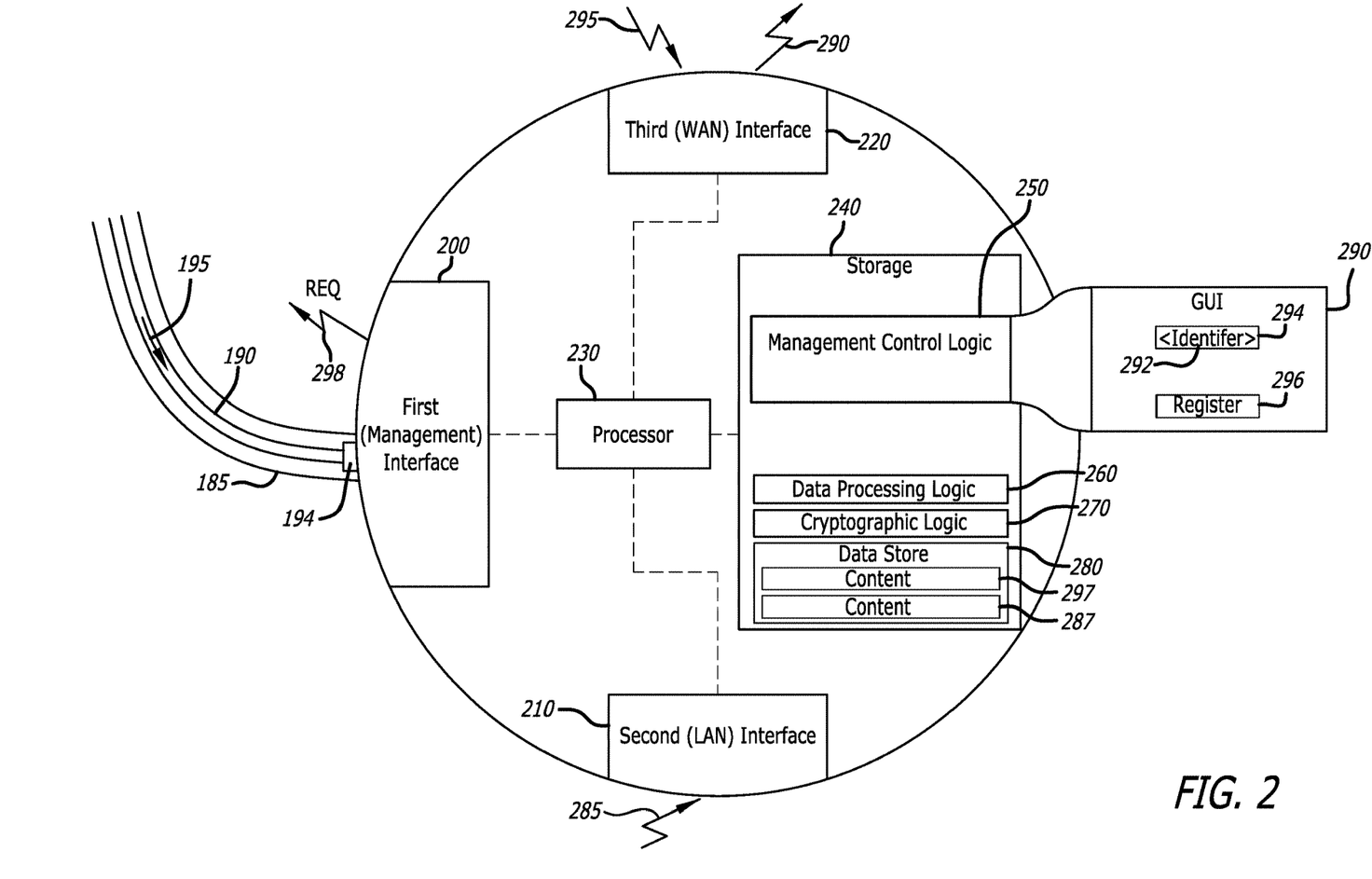
FIG. 2 is an exemplary embodiment of a multiple input/output (I/O) interface construct for the cloud connection appliance of FIG. 1.

Referring now to FIG. 2, an exemplary embodiment of the cloud connection appliance (CloudN) 140 of FIG. 1 is shown. Herein, the cloud connection appliance 140 is adapted with three input/output (I/O) interfaces 200, 210 and 220 communicatively coupled to a processor 230 and a non-transitory storage medium 240. The non-transitory storage medium 240 features management control logic 250, data processing logic 260, cryptographic logic 270 and a data store 280. In particular, after installation of the cloud connection appliance 140 within the datacenter 130, the management control logic 250 generates a graphic user interface (GUI) 290, which enables an administrator for the datacenter 130 to register the cloud connection appliance 140 with the controller 180. Such registration may accomplished by entry of an identifier 292, such as the public IP address or domain name associated with the controller 180, within a prescribed field 294 of the GUI 292. Such entry may be keyed or selection by a pull-down menu that identifies the controllers installed within the cloud platform 100.

Upon selection of a registration element 296, the management control logic 250 transmits a request message 298 to establish a secure communication path between the cloud connection appliance 140 and the controller (not shown). One type of secure communication path includes, but is not limited or restricted to the Secure Shell (SSH) communication path 185. Responsive to receipt of the request message 298 and authentication of the cloud connection appliance 140 and/or its users, the controller 180 (of FIG. 1) initiates a message exchange with the cloud connection appliance 140 via a prescribed port (e.g., TCP port 443). This message exchange establishes the SSH communication path 185 between the controller 180 and the cloud connection appliance 140 via the first interface 200, where the reversal tunnel 190 is encapsulated within the SSH communication path 185.

In accordance with a client-server relationship between the controller 180 and the cloud connection appliance 140, the cloud connection appliance 140 operates as the "client" during establishment of the reverse tunnel 190 (see FIG. 1) by initiating the request message 298 for transmission via the first interface 200 to commence creation of the reverse tunnel 190, operating as a dedicated, unidirectional communication path from the controller 180 (network port 192) to the cloud connection appliance (network port 194). After the reverse tunnel 190 has been established, however, the controller 180 operates as the client by forwarding control information 195 to the cloud connection appliance 140 via network ports 192/194, which is a secure communication path encapsulated within the SSH communication path 185 supported by the TCP port 443 in lieu of TCP port 22 that is normally reserved for SSH traffic. The TCP port 443 is open for both the controller 180 and the cloud connection appliance 140. Communications from the cloud connection appliance 140 to the controller 180 is accomplished through a message addressed to the IP address (e.g., HTTPS address) assigned to the controller 180 returned via the SSH communication path 185 outside of the reverse tunnel 190.

The cloud connection appliance 140 further includes the data processing logic 260, the cryptographic logic 270 and the data store 280. In particular, upon receipt of an incoming data message 285 from a computing device over the second I/O (LAN) interface 210, the processing logic 260 may configured to store content 287 of the data message 285 into the data store 280. The content 287 may include the data message 285 in its entirety or a portion of the data message 285 (e.g., payload from the data message 285; payload along with source and/or destination addresses from the data message 285, etc.). The cryptographic logic 270 accesses the content 287 within the data store 280 and conducts cryptographic operations on the content 287 to generate an encrypted message 290 for transmission to the transit VPC via the third I/O (WAN) interface 220.

Similarly, upon receipt of an incoming, encrypted data message 295 from a transit gateway (e.g., transit gateway 160$_1$ of FIG. 1) over the third I/O interface 220, the processing logic 260 may configured to store content 297 from the data message 295 into the data store 280. The content 297 may include the data message 295 in its entirety or a portion of the data message 295 (e.g., payload from the data message 295, payload, source/destination addresses from the data message 295, etc.). The cryptographic logic 270 accesses the content 297 within the data store 280 and conducts cryptographic operations on the content 297 to decrypt at least a portion of content 297 for transmission of the decrypted content (or re-encrypted content) to a destined computing device via the second I/O interface 210.

Figure 3:
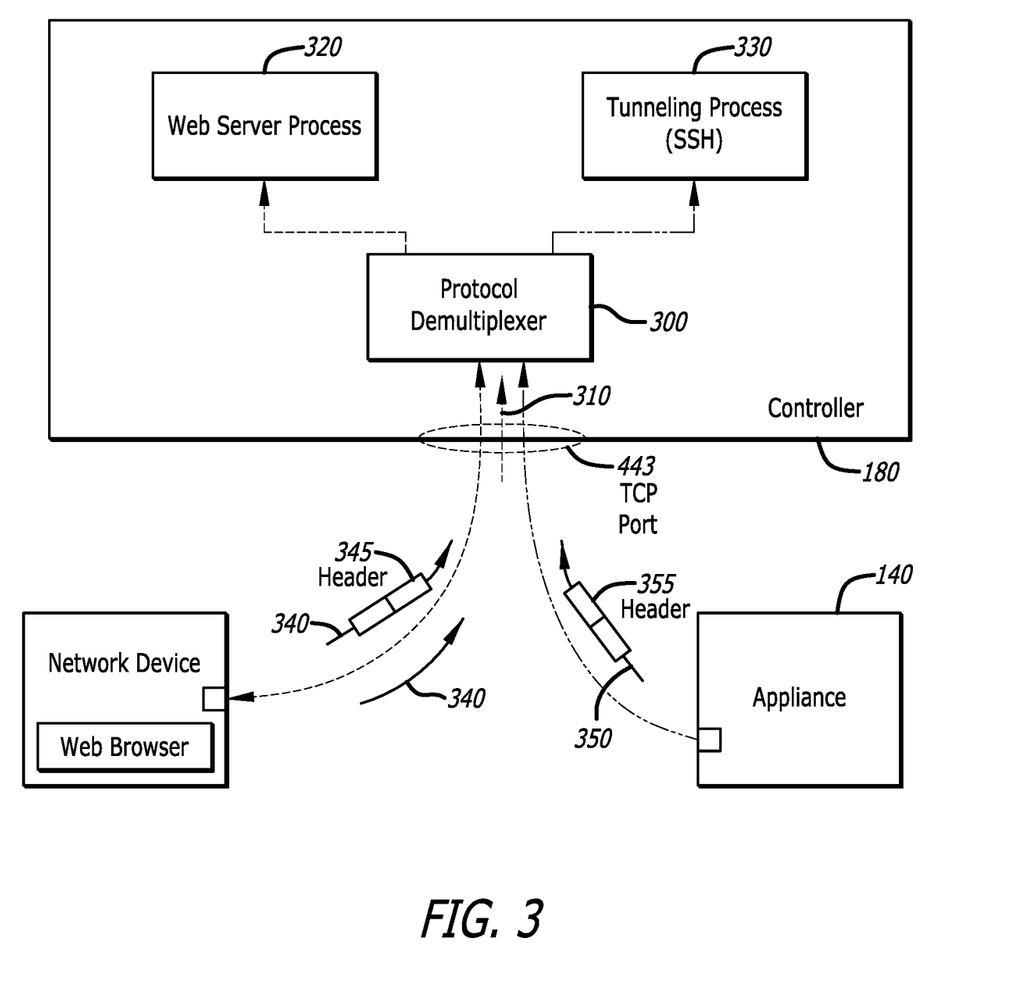
FIG. 3 is an exemplary embodiment of the controller of FIG. 1 including a protocol demultiplexer to conduct analytics of an incoming message for routing to a web server process (Hypertext Transfer Protocol Secure "HTTPS" protocol) or a tunneling process (Secure Shell "SSH" protocol).

Referring to FIG. 3, an exemplary embodiment of the controller 180 of FIG. 1 is shown. Herein, the controller 180 features a protocol demultiplexer 300 to conduct analytics of incoming messages 310 for routing to either a web server process 320 (Hypertext Transfer Protocol Secure "HTTPS" protocol) or a tunneling process 330 (SSH-based process). More specifically, the protocol demultiplexer 300 is configured to receive the incoming messages 310 over TCP port 443, where these incoming messages 310 may be encrypted content transmitted in accordance with different communication protocols, such as HTTPS and SSH communication protocols.

TCP port 443 constitutes a virtual port, not a physical port on a computer or any device. These virtual ports are numbered addresses, like TCP port 80, TCP port 443, TCP port 22, and TCP port 465, that computers can use to direct types of data traffic to certain processes that handle these types of data traffic. For example, TCP port 443 is reserved for HTTPS data traffic while TCP port 22 is reserved for SSH data traffic. However, the controller 180 is configured with the protocol demultiplexer 300 to receive HTTPS data traffic as well as SSH data traffic from the cloud connection appliance 140 over TCP port 443, in lieu of TCP port 22. One advantage is that TCP port 443 is normally open and a firewall or other security mechanism may block access to TCP port 22 to minimize attacks on the cloud platform.

As shown in FIG. 3, upon receipt of the incoming messages 310, the protocol demultiplexer 300 analyzes the header of each of these messages 310 to determine the communication protocol associated with that message. As an illustrative example, upon receipt of a first message 340, the protocol demultiplexer 300 analyzes a header 345 of the first message 340 to determine its communication protocol. Upon determining that the first message 340 utilizes the HTTPS communication protocol and is part of HTTPS-based data traffic transmitted over one of the communication links (e.g., communication link 17611), the protocol demultiplexer 300 routes content associated with the first message 340 to the web server process 320 for processing by the controller 180 (e.g., parsing, extracting content, performing operations based on the extracted content, etc.). Similarly, upon receipt of a second message 350, the protocol demultiplexer 300 analyzes a header 355 of the second message 350 to determine its communication protocol. Upon determining that the second message 350 is data traffic being transmitted in accordance with the SSH communication protocol (i.e. via the SSH communication path 185 of FIG. 1), the protocol demultiplexer 300 routes the second message 350 to the tunneling process 330 for processing by the controller 180.

Herein, the deployment of the protocol demultiplexer 300 enables the controller 180 to utilize TCP port 443 for both HTTPS data traffic and SSH data traffic and ensures that the different types of data traffic are routed to their corresponding processes.

III. Operational Flow

Figure 4:
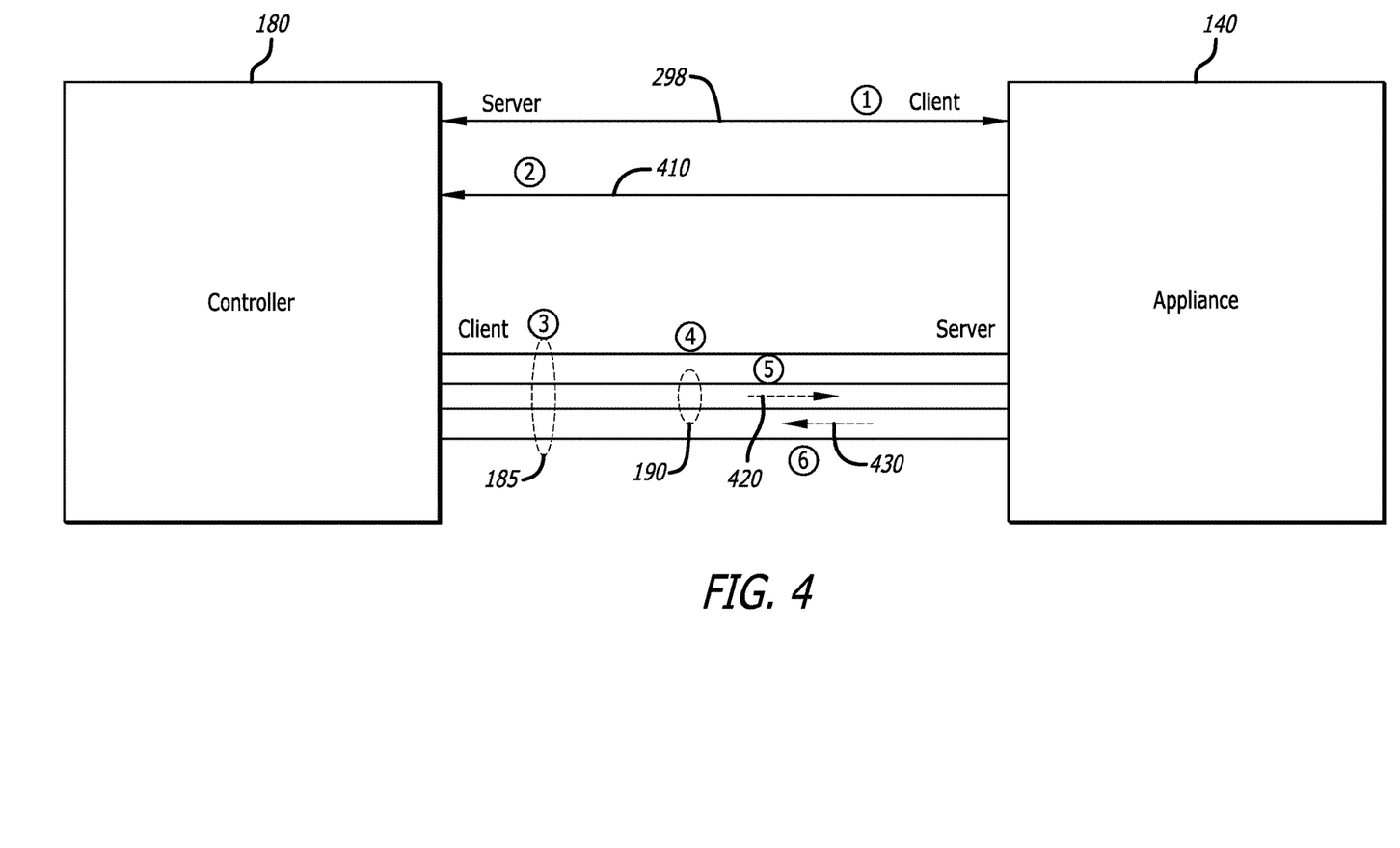
FIG. 4 is an exemplary embodiment of a method of operation for establishing and supporting a SSH communication path between the cloud connection appliance and the controller of FIG. 1.

Referring now to FIG. 4, an exemplary embodiment of a method of operation for establishing and supporting a secure (SSH) communication path between the cloud connection appliance 140 and the controller 180 of FIG. 1 is shown. Initially, the cloud connection appliance 140 is responsible for initiating the request message 298 to the controller 180 to establish the SSH communication path between these devices (operation 1). The request message 298 may be generated and transmitted during registration of the virtual application 140 with the controller 180. Thereafter, the cloud connection appliance 140 and the controller 180 undergo a message exchange 410 to authenticate these devices and to ensure that materials needed for exchanging encrypted data are available to each of these devices. These materials may include, but are not limited or restricted to some of all of the following: cryptographic keys, hash values, digital signatures, and/or digital certificates (operation 2). This message exchange 410 produces the secure communication path 185 between the cloud connection appliance 140 and the controller 180 along with the reverse tunnel 190 (operation 3).

During this "client-server" data exchange, the cloud connection appliance 140 operates as the "client" while the controller 180 operates as the "server". However, after the reverse tunnel 190 has been established, the controller 180 operates as the "client" while the cloud connection appliance 140 operates as the "server" (operation 4). More specifically, the controller 180 sends management messages 420 via TCP port 443 over the reverse SSH tunnel 190 to the cloud connection appliance 140, given that the cloud connection appliance 140 is not assigned a public IP address (operation 5). The management messages 420 may include executable commands, diagnostic information, code updates, or the like. Herein, messages 430 may be sent to the controller 180 from the cloud connection appliance 140 via TCP port 443 (operation 6), where the protocol demultiplexer 300 within the controller 180 identifies this incoming message as part of the SSH data traffic from the cloud connection appliance 140.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A controller comprising:
a computing device communicatively coupled to a cloud connection appliance;
a first process operating on the controller, the controller being deployed as a software component maintained within a non-transitory storage medium;
a second process operating on the controller; and
a protocol demultiplexer configured to receive an incoming message over a first virtual port and conducts an analysis of information within the incoming message to determine a communication protocol associated with the incoming message, the protocol demultiplexer routing contents of the incoming message to the first process in response to the communication protocol being a first communication protocol type and routing contents of the incoming message to the second process in response to the communication protocol being a second communication protocol type,
wherein the controller operates as a server during establishment of a secure communication path with the cloud connection appliance and subsequently operates as a client in response to a reverse tunnel being established with the cloud connection appliance as part of the secure communication path,
wherein data exchange between the controller and the cloud connection appliance are transmitted over the secure communication path via the first virtual port.

2. The controller of claim 1, wherein the first virtual port corresponds to a Transmission Control Protocol 443.

3. The controller of claim 1, wherein the first communication protocol type corresponds to a Hypertext Transfer Protocol Secure (HTTPS) communication protocol and the second communication protocol type corresponds to a Secure Shell (SSH) protocol.

4. The controller of claim 1, wherein the protocol demultiplexer conducts an analysis of the information within the incoming message by at least analyzing a header of the incoming message.

5. The controller of claim 1 being communicatively coupled to a cloud connection appliance via a reverse tunnel encapsulated within a Secure Shell (SSH) communication path to receive the incoming message.

6. The controller of claim 5, wherein the reverse tunnel enables the controller to directly send control information to the cloud connection appliance even though the cloud connection application lacks an assigned Internet Protocol (IP) address.

7. A cloud connection appliance, comprising:
a processor; and
a non-transitory storage medium communicatively coupled to the processor, the non-transitory storage medium comprises management control logic to control registration with a controller adapted to control data traffic between gateway instance and to establish an SSH communication path with the controller, the SSH communication path including a reverse tunnel encapsulated within the SSH communication path, wherein the controller and the cloud connection appliance operate in a client-server relationship with the cloud connection appliance operating as a client when establishing the communication path and prior to establishing the reverse tunnel and operating as a server when receiving control information through the reverse tunnel after establishing the reverse tunnel, wherein the reverse tunnel enables the cloud connection appliance to directly receive the control information from the controller despite the cloud connection application lacking an assigned Internet Protocol (IP) address, wherein data exchange between the controller and the cloud connection appliance are transmitted over a secure communication path via a same port, wherein the same port is a port not normally reserved for SSH traffic.

8. The cloud connection appliance of claim 7 further comprising:

a first input/output (I/O) interface to provide for an exchange of messages and control information with the controller;

a second I/O interface to provide for an exchange of messages with one or more computing devices deployed within a local area network; and a third I/O interface to provide for an exchange of messages with router for propagation over a wide area network.

9. The cloud connection appliance of claim 8, wherein the non-transitory storage medium further comprises data processing logic and cryptographic logic that operate on data for transmission as encrypted data messages over the second I/O interface and the third I/O interface.

10. A method for establishing direct communications between a cloud-based controller and a cloud connection appliance, comprising:

transmitting a request message from the cloud connection appliance to the cloud-based controller, the cloud-based controller and the cloud connection appliance operating in a client-server relationship with the cloud connection appliance operating as a client and the cloud-based controller operating as a server; and conducting a message exchange between the cloud connection appliance and the cloud-based controller to produce a secure communication path with a reverse tunnel encapsulated within the secure communication path, wherein data exchange between the cloud-based controller and the cloud connection appliance are transmitted over the secure communication path via a same port, wherein the cloud-based controller operates as a server and the cloud connection apparatus operates as a client prior to establishing the reverse tunnel, wherein after establishing the reverse tunnel, the cloud-based controller operates as the client and the cloud connection appliance operates as the server, wherein the reverse tunnel enables the cloud connection appliance to directly receive control information from the cloud-based controller despite the cloud connection application lacking an assigned Internet Protocol (IP) address, and wherein communication between the cloud-based controller and the cloud connection appliance is accomplished through a message addressed to an IP address assigned to the controller and returned via the secure communication path outside of the reverse tunnel.

11. The method of claim 10, wherein the transmitting of the request message is based on registration of the cloud connection appliance with the controller.

12. The method of claim 10, wherein the message exchange includes an exchange of information for use in cryptographic transmissions including at least one of one or more cryptographic keys, digital certificates, digital signatures, or hash values.

13. The method of claim 10 further comprising:

transmitting a management message via a Transmission Control Protocol (TCP) 443 port from the cloud-based controller to the cloud connection appliance, the management message includes an executable command to control operability of the cloud connection appliance.

14. The method of claim 10 further comprising:

transmitting data traffic via the TCP 443 port from the cloud connection appliance to the cloud-based controller, wherein the cloud-based controller conducts an analysis of a communication protocol associated with the data traffic to determine which process of a plurality of processes to which data associated with the data traffic is directed.

15. The method of claim 14, wherein the cloud-based controller comprises a protocol demultiplexer configured to receive the data traffic over the TCP 443 port.

16. The method of claim 14, wherein the analysis of the communication protocol associated with the data traffic comprises routing the data to a first process of the plurality of processes when the communication protocol corresponds to a Hypertext Transfer Protocol Secure (HTTPS) communication protocol and routing the data to a second process of the plurality of processes when the communication protocol corresponds to a Secure Shell (SSH) protocol.

17. The controller of claim 1, wherein the first process corresponds to a web server process.

18. The controller of claim 1, wherein the first process corresponds to a tunneling process.

\* \* \* \* \*